J. P. GROSET.
PASTRY BAKING MACHINE.
APPLICATION FILED MAR. 25, 1914.

1,122,913.

Patented Dec. 29, 1914.
6 SHEETS—SHEET 1.

FIG. 1

WITNESSES:
O. Johnson
F. C. Matheny

INVENTOR
John P. Groset
BY
C. D. Haskins
ATTORNEY

J. P. GROSET.
PASTRY BAKING MACHINE.
APPLICATION FILED MAR. 25, 1914.

1,122,913.

Patented Dec. 29, 1914.
6 SHEETS—SHEET 2.

WITNESSES:
O. Johnson
T. C. Matheny

INVENTOR
John P. Groset
BY
C. W. Haskins
ATTORNEY

J. P. GROSET.
PASTRY BAKING MACHINE.
APPLICATION FILED MAR. 25, 1914.

1,122,913.

Patented Dec. 29, 1914.
6 SHEETS—SHEET 3.

WITNESSES:
O. Johnson
F. C. Matheny

INVENTOR
John P. Groset
BY
C. D. Haskins
ATTORNEY

J. P. GROSET.
PASTRY BAKING MACHINE.
APPLICATION FILED MAR. 25, 1914.

1,122,913.

Patented Dec. 29, 1914.
6 SHEETS—SHEET 4.

WITNESSES:
O. Johnson
F. C. Matheny

INVENTOR
John P. Groset
BY
C. W. Haskins
ATTORNEY

J. P. GROSET.
PASTRY BAKING MACHINE.
APPLICATION FILED MAR. 25, 1914.

1,122,913.

Patented Dec. 29, 1914.
6 SHEETS—SHEET 6.

WITNESSES:
O. Johnson
L. C. Matheny

INVENTOR
John P. Groset
BY
C. D. Haskins
ATTORNEY

UNITED STATES PATENT OFFICE.

JOHN P. GROSET, OF SEATTLE, WASHINGTON.

PASTRY-BAKING MACHINE.

1,122,913. Specification of Letters Patent. Patented Dec. 29, 1914.

Application filed March 25, 1914. Serial No. 827,146.

*To all whom it may concern:*

Be it known that I, JOHN P. GROSET, citizen of the United States, residing at Seattle, in the county of King and State of Washington, have invented a certain new and useful Improvement in Pastry-Baking Machines, of which the following is a specification.

My invention relates to improvements in baking machines but particularly it relates to improvements in baking machines which are used to mold and bake pastry in the form of hollow cones which may serve as receptacles for ice-cream, which receptacles are commonly known as ice-cream cones, and the object of my improvement is to provide a machine embodying several interrelated mechanisms which shall be adapted to operate automatically to mold and bake such ice-cream cones, and then to discharge them from such machine in successive packages each of which packages may contain a desired number of such cones. I accomplish this object by devices illustrated in the accompanying drawings in which—

Figure 2:
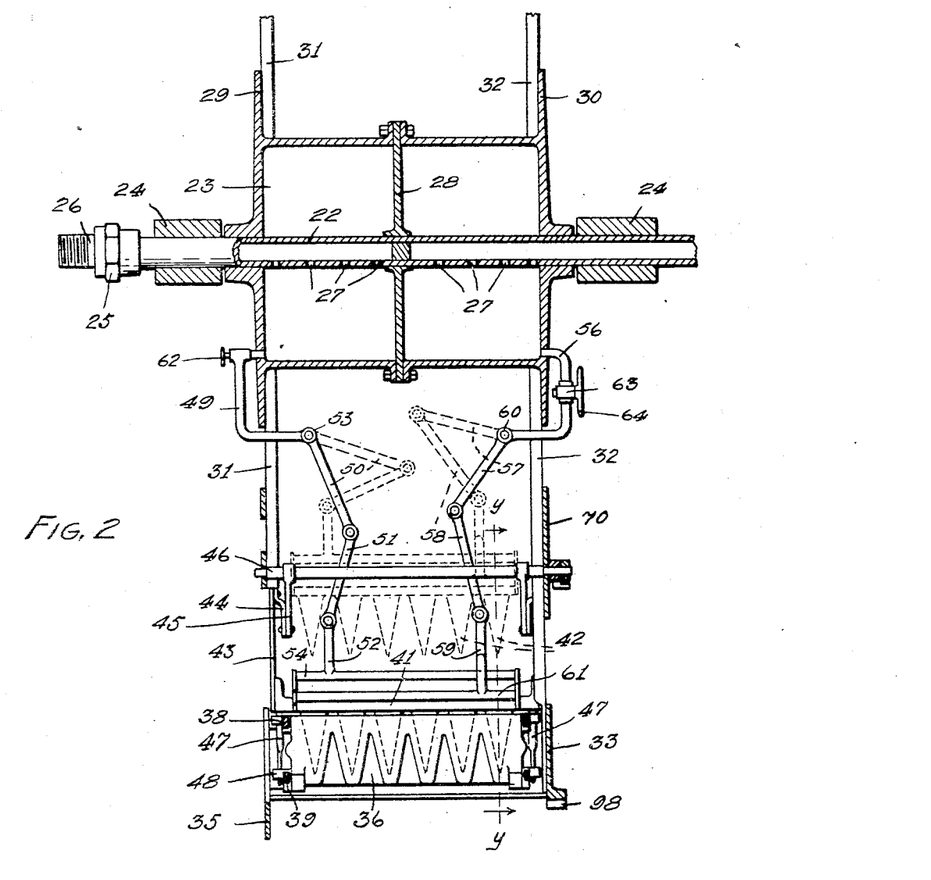
Fig. 2 is an enlarged view of the same in cross-section on broken line $x, x$ of Fig. 1.

Referring to the accompanying drawings, throughout which like reference numerals indicate like parts, 20 and 21 are the two sides, respectively, of a frame, and 22 is a tubular shaft upon which is disposed a cylindrical drum 23, the shaft 22 being journaled in suitable bearing boxes 24, that are provided on the top sides of each of the frame members 20 and 21, as more clearly shown in Fig. 2, and such shaft 22 being connected at each of its ends by suitable swivel couplings 25 (only one of which is shown) with pipes 26 that are connected with a source of fluid fuel, as gas, from which tubular shaft 22 gas may flow outwardly through perforations 27 into the drum 23, such drum 23 preferably being divided into two separate compartments by a partition 28, each of such compartments serving as a mixing and pressure chamber for such gas.

The drum 23 is provided on each end with flanges 29 and 30 to which are secured a plurality of outwardly extending channel shaped arms 31 and 32 which radiate therefrom like the spokes of a wheel. The arms 31, which are secured to the flange 29 on one side of the drum 23, being of shorter length and extending only part of the way to the periphery of a mold-carrying wheel of which they form a part while the arms 32 that are secured to the flange 30 extend to and connect with a circular plate 33, more clearly shown in Figs. 2 and 4, which forms a portion of the periphery of the mold-carrying wheel.

Secured at one end to the inside surface of the circular plate 33, at intervals midway between the arms 32, and extending crosswise of the periphery of the mold-carrying wheel, are a plurality of equidistantly spaced I shaped partition members 34, which serve to divide the circumferential portion of the mold carrying wheel into a plurality of separate compartments, such members 34 being secured together at their other ends by a circularly shaped fluted plate 35 which serves to brace the structure and make it more rigid and at the same time provides at the ends of the partition members 34 an easy means of gaining access to the compartments therebetween.

Figure 3:
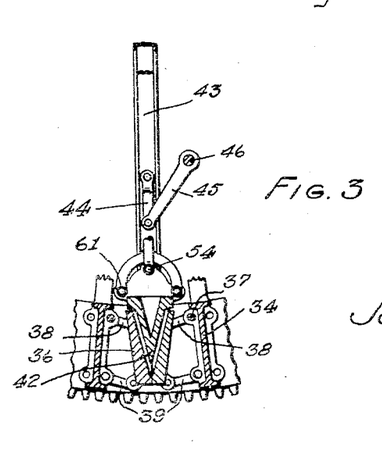
Fig. 3 is a fragmentary view of the same in cross-section on broken line $y, y$ of Fig. 2.

Within each of the compartments formed by the partition members 34 are disposed two separable mold members 36 each of which has its upper portion articulated with a shaft 37 by a link 38 and its lower portion articulated with the adjacent partition 34 by a similar link 39, the link 38 being fixedly secured to the shafts 37 whereby said mold members 36 may be moved apart or may be moved together, as shown in Fig. 3, by a rotary movement of the shaft 37 each of the mold members 36 being provided on its inner surface with a plurality of recesses 40, herein shown to be six in number, shaped like one half portion of a cone that has been cut on its longitudinal axis, said two mold members 36 when moved together, as shown in Fig. 3, being adapted to form a mold containing a plurality of conically shaped recesses in each of which recesses batter may be baked to form an ice-cream cone.

Figure 1:
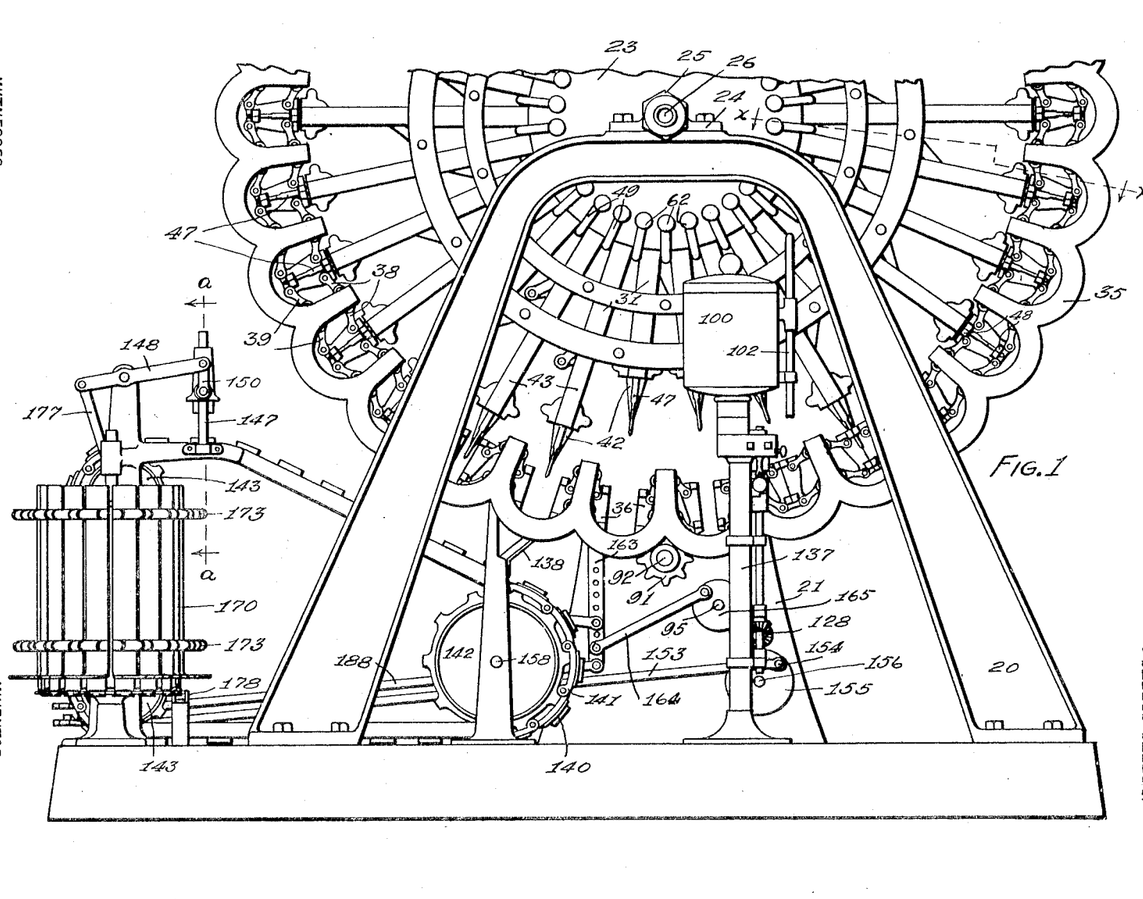
Figure 1 is a fragmentary view in side elevation of a machine embodying my invention.

A transverse bar 41 on which are provided a plurality of cores or cone forming members 42, corresponding in form and numbers to the conically shaped recesses 40, in the molds 36, is associated with each pair of such molds the bar 41 being secured at each end to guide members 43 that are adapted to slide within the radially disposed channel shaped arms 31 and 32 whereby the cone shaped cores 42 may be moved radially of the mold carrying wheel to a position within the mold recesses 40, as more clearly shown in Fig. 3, or may be withdrawn from such mold recesses, as shown in Fig. 1, the guide members 43 each having a short link 44 pivotally connected therewith, such short link 44 being articulated with one end of a longer link 45 that has its other end fixedly secured to a shaft 46 whereby rotary movement of the shaft 46 will cause the guide members 43 to move lengthwise within the channel shaped arms 31 and 32 thus moving the transverse core carrying bar 41 radially of the mold-carrying wheel to cause the cone shaped cores 42 to be thrust into or withdrawn from the recesses 40 the bar 41 being provided on each end with dowel pins 47 that are adapted to project through perforations in lugs 48 that are provided on the ends of mold members 36 accurately to center the cores 42 within the cone shaped recesses 40.

Figures 12, 15:
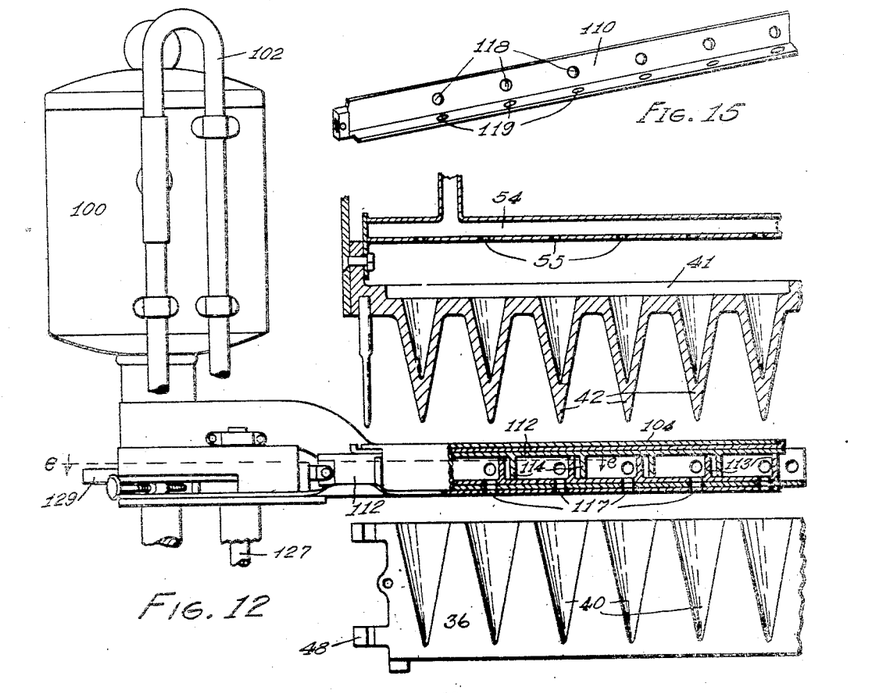
Fig. 12 is a view partly in side elevation and partly in vertical section of a depositing device that is associated with my machine showing the relation of such device to various parts of the baking device in certain operative positions that such parts may assume.
Figs. 15, 16 and 17 are views in perspective of details of my invention.

The cores 42 and the cone forming molds 36 in each compartment of the machine herein illustrated are adapted to be heated by a gas flame, the gas that heats the cores 42 being conducted from one compartment of the drum 23 through pipes 49, 50, 51 and 52 which are preferably united with each other by ground joint unions 53 in such manner that they form a flexible connection with a transverse pipe 54 that is adapted to extend lengthwise along the core-carrying bar 41 at a slight distance inwardly therefrom, such pipe 54 being provided with a plurality of perforations 55, more clearly shown in Fig. 12, which are adapted to emit a jet of gas outwardly into each of the hollow cone shaped cores which gas may be ignited to burn and heat said core, while the gas that heats the mold members 36 is conducted from another compartment in the drum 23, through pipes 56, 57, 58 and 59 which are preferably connected with each other by ground joint unions 60 in such manner that they form a flexible connection with two transverse pipes 61 which pipes 61 are provided with perforations (not shown) similar to the perforations 55 and are suitably located one on each side of the core carrying bar 41 in positions to adapt them each to emit gas outwardly into the space between the outside surface of the mold members 36 and the adjacent partitions 34 where such gas may be ignited to burn and heat the members 36.

Figure 4:
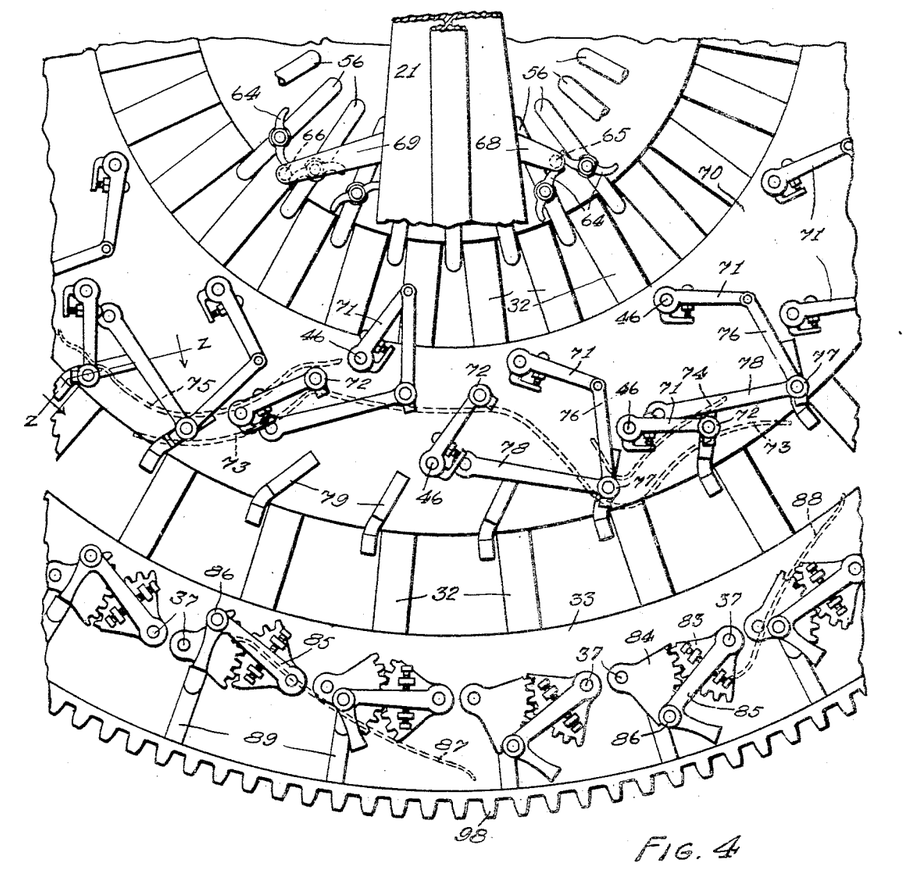
Fig. 4 is an enlarged fragmentary view in side elevation of a portion of the side of the rotatable baking wheel that is opposite to the side shown in Fig. 1, such Fig. 4 showing various mold actuating devices in different operative positions and illustrating by broken lines the positions of certain cams that are adapted to move the said mold actuating devices.

The pipe 49 is provided at a suitable point with a regulating valve 62 by which the supply of gas that is delivered to the pipe 54 may be regulated or may be entirely shut off and the pipe 56 is provided with a valve 63 to which is secured a T shaped handle 64, as more clearly shown in Figs. 2 and 4, which handle 64 is adapted to be engaged by a pin 65 to close such valve and by another pin 66, which is located at a different point, to open such valve, as the mold carrying wheel revolves, the pins 65 and 66 being secured in brackets 68 and 69 respectively, that are fastened to the frame 21, as more clearly shown in Fig. 4, and such brackets preferably being independently adjustable whereby the pins 65 and 66 may be so set that they will cause the gas in the pipes 61, 61 to be shut off at any desired point during a rotation of the mold carrying wheel and to continue shut off for any desired portion of such rotation, the pipes 50, 51, 57 and 58 approaching alinement, as shown by full lines in Fig. 2, when the core carrying bar 41 is moved outwardly and assuming a position substantially, as shown by broken lines in Fig. 2, when the core carrying bar 41 is withdrawn.

Figure 6:
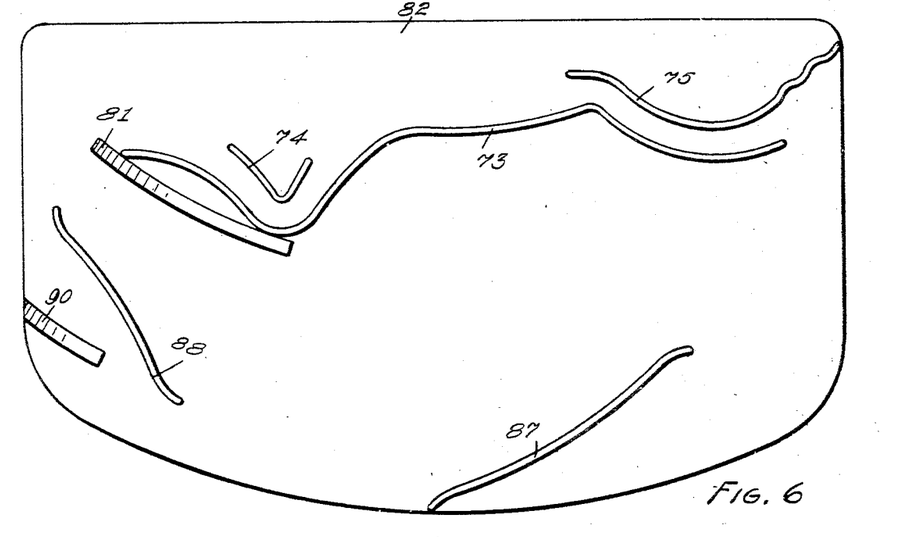
Fig. 6 is a plan view of a cam plate.

The shafts 46 which are connected by the levers 44 and 45 with the core carrying bars 41 are adapted to extend through a bearing plate 70 on the side of the mold carrying wheel and have lever arms 71 secured to their outer ends, such shafts 46 being alternately staggered in their positions in the plate 70 to afford freedom of movement for the lever arms 71 and the lever arms 71 that are connected with the outermost of said shafts 46 being provided on their free ends with rollers 72 that are disposed to be engaged by cams 73, 74 and 75, as indicated by broken lines in Fig. 4, and more clearly shown in Fig. 6, to move such lever arms 71 and impart rotary movement to the shafts 46 to raise and lower the cores 42 while the lever arms 71 that are connected with the innermost of said shafts are articulated with links 76 upon which are provided cam rollers 77 similar to the cam rollers 72 and adapted to engage with the same cam surfaces 73, 74 and 75, the links 76 being articulated with other links 78 that are pivotally secured to the plate 70 whereby when the cam rollers 77 are moved by contact with the cam surfaces 73, 74 and 75 rotary movement will be imparted to the shafts 46 connected therewith and the mold cores 42 will be raised or lowered.

Figure 5:
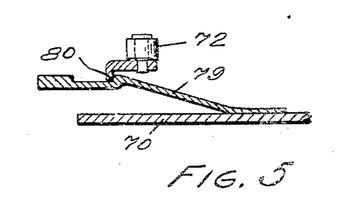
Fig. 5 is an enlarged view in cross-section on broken line $z, z$ of Fig. 4.

The lever arms 71 are preferably adjustably secured to the shafts 46 and such lever arms 71 are each adapted to be locked in a closed position by a spring catch 79 that is adapted to engage with a hook 80 that is provided on the lever arm 71, as more clearly shown in Fig. 5, the catch 79 being so positioned that it may be engaged by the rounded surface of an outwardly projecting cam 81 that is provided on the cam plate 82, as shown in Fig. 5, to release the arm 71.

The shafts 37 which by their turning impart movement to the links 38 to spread the mold members 36 of each of the two part molds apart, are arranged in pairs and disposed to extend outwardly through the plate 33 and have sector gears 83 and 84 that are adapted to mesh with each other secured thereto, one shaft of each pair of the shafts 37 having a lever arm 85 secured thereto, which lever arm 85 is provided with a cam roller 86 that is adapted to be engaged and moved by cams 87 and 88 on the cam plate 82 to impart a rotary movement to the shaft 37 thus rotating the sector 83 through a portion of a revolution whereby such sector 83 will cause the sector 84 with which it is in mesh to rotate in an opposite direction through a portion of a revolution, the two shafts 37 of each pair of shafts thus rotating in opposite directions to spread the molds 36 apart or move such molds together.

A locking device consisting in a spring catch 89, similar to the catch 79 and adapted to engage with a hook (not shown) on the lever arm 85 which is similar to the hook 80 on the lever arm 71, is provided to lock the molds 36, in a closed position and an outwardly curved cam 90 is provided on the cam plate 82 to release the spring catch 89 at the proper instant of time to permit the cam 87 to open the molds 36.

The plate 33 is provided on its outer periphery with gear teeth 98 that are adapted to mesh with the gear teeth of a pinion 91 which is secured to a shaft 92 that extends through the frame 21 and is provided at a point on the outside of such frame with a large gearwheel 93 that is adapted to mesh with a smaller gearwheel 94 which is secured to a shaft 95 and in turn is adapted to mesh with another smaller gear wheel 96 that is provided on a driven shaft 97 whereby when the shaft 97 is rotated by any desired source of power (not shown) motion will be transmitted through the gearwheels 96, 94 and 93 to the pinion 90 to drive the mold carrying wheel of which the circular plate 33 forms a portion.

Figures 13, 14, 16, 17:
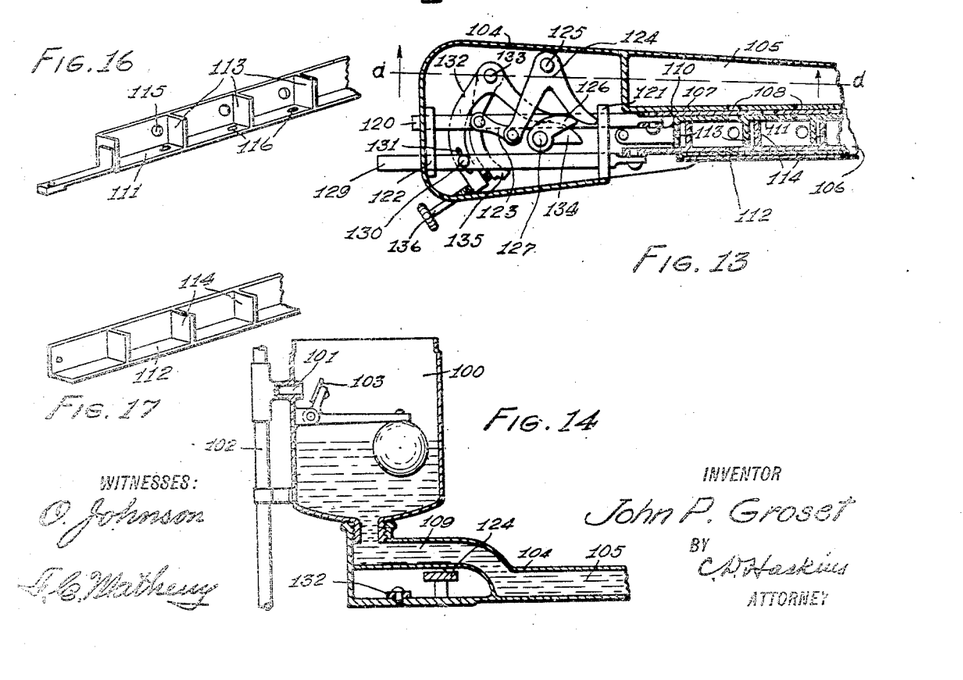
Fig. 13 is a fragmentary view in horizontal section on broken line $e, e$ of Fig. 12.
Fig. 14 is a view on a reduced scale on broken line $d, d$ of Fig. 13, as the device would appear if the batter tank shown in Fig. 12 were rotated in a clockwise direction through an angle of ninety degrees.

A batter tank 100 which is connected by a passageway 101 with a tube 102 having the shape of an inverted letter U through which batter under a low pressure may be caused to flow is provided with a float valve 103, as clearly shown in Fig. 14, whereby when the batter within such tank 100 shall have reached a certain predetermined height the valve 103 will close the passageway 101 and the batter will be caused to flow upwardly around the U shaped end of such tube and return to the source of supply (not shown) from which such batter is taken, the batter thus circulating constantly in the tube 102 whereby when the float valve 103 is opened slightly by the removal of batter from the tank 100 more batter will immediately flow into such tank thus keeping the pressure at the outlet of such tank, which is in its bottom side constant, such outlet being connected with a casing 104 which forms a portion of a depositing device that is adapted to extend across the mold carrying wheel near its lower periphery in such position, as illustrated in Figs. 1 and 12, that it shall be directly above the molds 36 when the cores 42 are in a raised position whereby batter may be deposited in such molds.

The casing 104 is divided into two compartments 105 and 106 by a wall 107 such wall 107 being provided with a plurality of equidistantly spaced perforations 108 through which batter may flow, such batter being allowed to flow into the compartment 105 through a passageway 109 that communicates with the tank 100.

Within the compartment 106 are disposed three batter ejecting members 110, 111 and 112 shaped like angle bars, as more clearly illustrated in Figs. 15, 16 and 17, the members 110 and 112 being adapted to slide endwise within the compartment 106 and the member 111 being fixedly secured within such compartment, such member 111 being provided with a series of partitions 113 and being adapted to fit within the member 110 while the member 112 is provided with a plurality of similar partitions 114 and is adapted to be placed in an inverted position upon the member 111 in such manner that the partitions 113 snugly fit within the member 112 and the partitions 114 snugly fit within the member 111, as more clearly shown in Fig. 13. The side of the fixed member 111 is provided with a plurality of perforations 115 that register with the perforations 108 and the bottom of such member 111 is provided with a plurality of similar perforations 116 that register with perforations 117 that are provided in the bottom wall of the compartment 106, the member 110 being interposed between the member 111 and the walls of the receptacle 106, the side wall of such member 110 being provided with a plurality of perforations 118, that are adapted when such member 110 is in one position to register with the perforations 108, and the bottom wall of such member 110 being provided with a plurality of similar perforations 119 that are adapted when such member 110 is in a different position to register with the perforations 117 that are provided in the bottom wall of the compartment 106, the openings 108 being closed by the member 110 when the openings 117 are opened and vice versa.

The member 110 is secured to the end of a bar 120 that is slidably disposed in guides 121 and 122 and is connected by a link 123 with one arm of a bell crank shaped actuating member 124 that is adapted to be oscillated about its pivot point 125 by a rotatably mounted cam 126 which is secured to a shaft 127 that is connected by a bevel gear 128 with the driving mechanism of the machine, as more clearly shown in Fig. 1. The cam 126 being adapted in its rotation to wipe first one arm and then the other arm of the actuating member 124 to cause the bar 120 to move backwardly and forwardly within the guides 121 and 122 to move the member 110.

The member 112 is secured to the end of a bar 129 that is similar to the bar 120 and is similarly disposed to slide in the guides 121 122, such bar 129 being provided with a pin 130 that is adapted to project through a slot 131 which is provided in a bell crank shaped actuating member 132 that is adapted to be oscillated about its pivot 133 by a rotatably mounted cam 134 which is similar to the cam 126 and is secured to the same shaft 127 whereby the movement of the two bars 120 and 129 may have a fixed relation with respect to time, the actuating member 132 being provided with an arm 135 that may be adjusted by moving a screw 136 to vary the length of stroke of the bar 129 thus varying the length of stroke of the member 112.

The tank 100 and casing 104 may be placed upon a support 137, more clearly shown in Fig. 1, in a suitable position for operation, the perforations 117 being so disposed that the center of each of the cone shaped recesses 40 will pass directly under one of such perforations just after the mold sections 36 have passed the lowermost point in their movement of rotation and have been closed by the action of the cam 87.

The rotation of the shaft 127 bears a fixed relation to the movement of the molds 36 and as each mold approaches the casing 104 the member 110 is moved backwardly by the action of the cam 126 thus causing the perforations 118 to register with the perforations 108 and as soon as such perforations are thus caused to register the cam 134 acts to move the member 112 backwardly thus by the action of the partition 114 creating a suction that draws a charge of batter from the chamber 105 into the spaces within the members 111 and 112, whereupon the member 110 is moved forwardly by the action of the cam 126 sufficiently to close the perforations 108 and to cause the perforations 119 in the bottom of the member 110 to register with the holes 117 in the bottom of the compartment 106 and at the same time that the perforations 117 are opened the member 112 is moved forwardly by the action of the cam 134 thus causing the partitions 114 to serve as pistons to eject a sufficient charge of batter downwardly through each of the holes 117 into the conical recesses within the mold members 36 to form an ice-cream cone, the movements of the depositing device being so timed that each successive mold shall receive its deposit of batter as it passes such depositing device.

Figure 7:
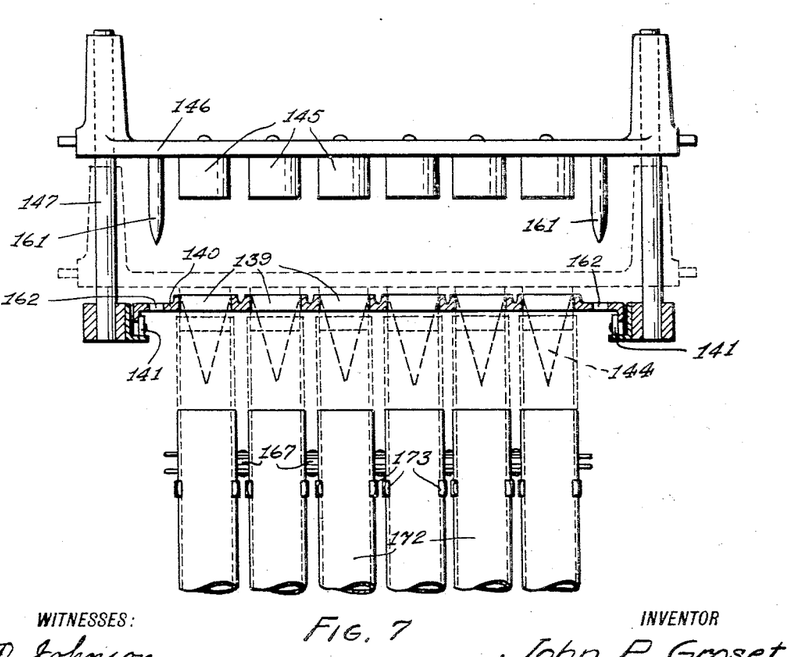
Fig. 7 is an enlarged fragmentary view in vertical section on broken line $a, a$ of Fig. 1, certain parts being shown in side elevation.
Figures 8, 9, 10, 11:
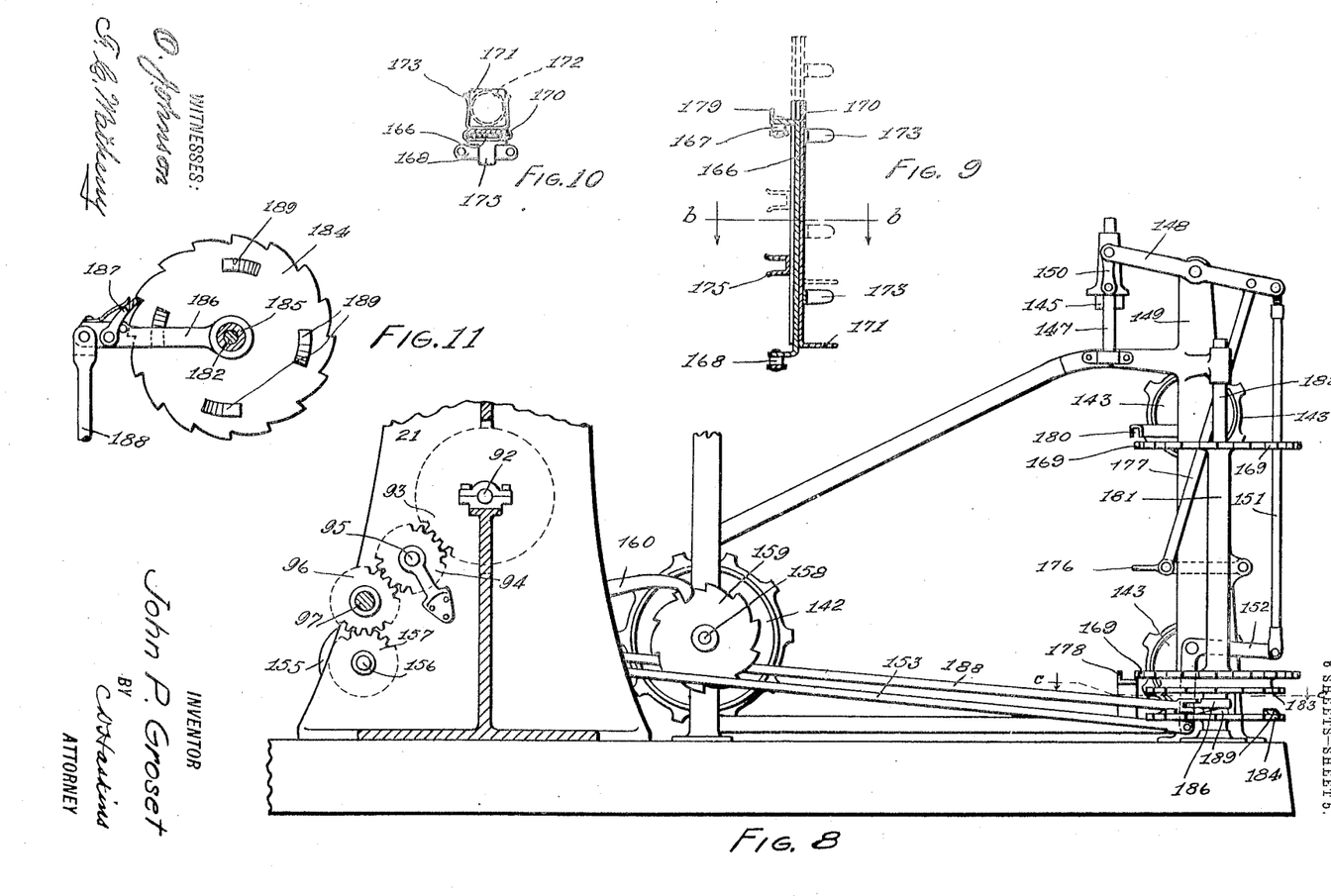
Fig. 8 is a view in side elevation of certain portions of the driving mechanism and of mechanism for packing the baked cones.
Fig. 9 is a view in vertical section of a detail of my invention.
Fig. 10 is a view in cross-section on broken line $b, b$ of Fig. 9, illustrating by broken lines the position of a tubular container that may be associated therewith.
Fig. 11 is an enlarged view in horizontal section on broken line $c, c$ of Fig. 8.

After the molds 36 have passed the depositing device the cores 42 are automatically thrust into such molds to form cones of the batter that has been deposited therein, such batter in its conical form then being baked by the heat of a gas flame for the larger part of one revolution of the mold carrying wheel and the baked cones then being automatically discharged by the separating of the mold sections 36 onto a grooved guide member 138 at a point slightly in advance of the mold carrying wheel, the grooved guide member 138 serving to guide such cones separately into circular holes 139 provided in the cross bars 140 of a traveling conveyer, such cross bars 140 being secured at both ends to chains 141 that are adapted to engage with and move over suitable driven sprocket wheels 142 and other idler sprocket wheels 143, as more clearly shown in Figs. 1 and 8 each of the cones 144 being adapted by reason of its shape to have its top edge engaged with the circumference of one of the holes 139 to hold such cone in a suspended position, as more clearly shown in Fig. 7, until such cone 144 shall have been punched out of such hole 139 by the downward movement of a cylindrical punching member 145, a plurality of such punching members 145 being associated with a vertically movable transverse bar 146 which bar 146 is slidably mounted at each end on vertical standards 147 and is adapted to be moved upwardly and downwardly by lever arms 148 that are fulcrumed on upright frame pieces 149 and are connected with such cross bar 146 by links 150, one of such lever arms having its outer end connected by a link 151 with one arm of a bell crank 152, which bell crank 152 is fulcrumed on the frame piece 149 and has its other end articulated with a horizontal link 153 that is eccentrically connected by a crank pin 154 with a disk 155 that is provided on a shaft 156 which extends through the frame 21 and is provided on its outer end with a pinion 157 that is adapted to mesh with the gearwheel 96 whereby a vertical reciprocating motion may be imparted to the bar 146.

The driven sprocket wheel 142 are secured to a shaft 158 which is provided with a ratchet wheel 159 that is adapted to be engaged and moved by a pawl 160 to move successive cross bars 140 underneath the punching members 145 to permit such punching members in their downward movement to punch out the cones 144 that may be suspended within the holes 139 provided in the bars 140, dowel pins 161, that are provided on each end of the bars 140 being adapted to project within holes 162, provided in each of such bars 140 to insure that the punching members 145 may always be accurately centered as they move downwardly through the holes 139.

The pawl 160 is secured to a swinging bar 163 which may be articulated with the frame 21, such bar 163 being eccentrically connected by a link 164 with a crank disk 165 that is provided on the shaft 95 whereby it may be moved backwardly and forwardly to impart a succession of forward movements to the endless cone conveyer such conveyer being at rest for a sufficient length of time between successive movements to permit the punching members 145 to be moved downwardly to punch out the cones 144 from one of the bars 140 and then to be withdrawn and such conveyer then being moved forward sufficiently to bring the next successive bar 140 underneath the punching members 145 while such members are raised.

In order that the cones 144 may be cared for when they are punched out of the holes 139 in the conveyer bars 140 I have provided an endless belt composed of a plurality of vertically disposed flat plates 166 that are secured at their top and bottom ends to endless sprocket chain 167 and 168, respectively, and are adapted to pass around sprocket wheels 169 each of said plates having slidably associated therewith a tube carrying member 170 that is provided at its bottom with an outwardly projecting plate 171 upon which a tube 172, more clearly shown in Fig. 7, may rest and being further provided at intervals throughout its length with pairs of grasping arms 173 that are adapted to grasp the tube 172 to hold such tube in an upright position such member 170 being provided on its back side with a U shaped vertical shifting clip 175 that is adapted to straddle the edge of a plate 176 that extends transversely of the frame and is adapted to be raised and lowered by links 177, that are connected with the outer ends of the lever arms 148 whereby as the punching members 145 are moved downwardly the tube carrying member 170 may be moved upwardly to lift the tubes 172 upwardly to receive the cones that are punched out of the holes 139 in the bars 140, the tube carrying members 170 being again lowered as the punching members 145 are raised to permit the next cone conveyer bar 140 to be moved to its position below the punching member.

The lower sprocket chain 168 is adapted to move in a lower guideway 178 and each of the links of the upper sprocket chain 167 is provided with an upwardly projecting guide piece 179 that is adapted to move in an upper guideway 180, more securely to hold the tubes 174 in their proper position.

The sprocket wheels 169 around which the tube carrying belt is adapted to pass are spaced apart by a sleeve 181 to which they are secured, such sleeve 181 being rotatably mounted on a vertical shaft 182 and a ratchet wheel 183 is secured to the lowermost side of the lower sprocket wheel 169, such ratchet wheel 183 being spaced sufficiently above another similar ratchet wheel 184 by means of a collar 185 to permit a pawl arm 186 that is pivoted on the shaft 182 freely to move therebetween such pawl arm 186 carrying a spring pressed pawl 187 that is adapted at all times to engage with the ratchet wheel 184 and a part of the time to engage with the ratchet wheel 183, secured thereto, and having its outer end connected by a link 188 with the swinging arm 165 whereby such pawl arm may be made to oscillate about the shaft 182 to move the pawl 187 back and forth over the periphery of the ratchet wheel 184 to cause said pawl to engage with the teeth of said ratchet wheel and impart a series of movements to such wheel which movements occur concurrently with the movements of the cone carrying belt which is moved by the action of the pawl 160, the sprocket wheels 169 and tube carrying belt that is adapted to move on such wheels being at rest when the ratchet wheel 184 only is engaged by the pawl 187 and such ratchet wheel 184 being provided at equidistant points on its top surface with four lifting cams 189 that are each adapted to engage with and raise the pawl arm 186 as such pawl arm 186 passes thereover to cause the pawl 187 to engage with a tooth of the ratchet wheel 183 at this point to impart a slight rotary movement to such ratchet wheel to move the tube carrying belt through a space equal to the distance between the centers of two adjacent tubes, the pawl arm 186 then dropping off of the lifting cam 189 and the sprocket wheels 169 and the tube carrying belt that is moved thereby then remaining at rest during the next four forward excursions of the pawl 187 or until such pawl has moved the ratchet wheel 184 sufficiently to cause another of the lifting cams 189 to engage with and lift the pawl arm 186.

The tube carrying belt in the device illustrated is adapted to move one space in unison with every fourth movement of the cone carrying belt whereby four cones may be delivered into such tube each time such tube is stopped during its passage under the bars 140 of the tube carrying belt such bars 140 each being provided with six cone carrying apertures whereby a tube 174 will have stopped six times during its passage under the cone carrying belt and will have received four cones at each stop thus causing 24 cones to be placed in each tube although obviously the arrangement of the ratchet wheel 184 may be such that any other desired number of cones may be placed in each tube.

The mold carrying wheel moves constantly while the machine is in operation and after the batter has been deposited in the cone shaped recesses 40 of the molds 36 and the cores 42 have been thrust therein to form the cone then such cone is baked as the wheel revolves until the cam roller 72 on the lever arm 71 approaches a position, as illustrated in Fig. 4, where it is engaged by the cam 73 to lift the cores 42 slightly, which cores are again lowered immediately by the action of the cam 74 on the same cam roller 72, such raising and lowering of the cores 42 serving to loosen them from the baked cones.

As soon as the cores 42 have been loosened from the cones the cam roller 86 on the lever arm 85 is engaged by the cam 88 and moved to spread the molds 36 apart, the cores 42 which have been loosened from the cone but still project therein holding such cone in a central position and insuring that such cone will be loosened from such molds 36 at the proper instant of time to drop on the guide plate 138 by which it may be guided into a hole in one of the bars 140.

After the cones are released the cores 42 are raised by the action of the cam plate 73 to a sufficient height to clear the casing 104 of the depositing device and the molds 36 are closed by the action of the cam 87 before they pass under such depositing device whereby they may receive another charge of batter, the cores 42 being lowered into the conically shaped openings 40 of the molds by the cam 75 as soon as they have passed over the depositing device, such cores 42 when lowered being adapted to be sufficiently spaced from the walls of the molds to form a cone of the batter that has been deposited in such molds.

During a period of operation of my machine the flame that is fed by gas from the pipes 54 and heats the cores is permitted to burn continuously but the flame at the sides of the molds 36 that is fed by gas from the pipes 61 is adapted to be extinguished by the closing of the valve 63 just before the baked cones are released and is adapted to be relighted by the flame within the cores 42 when the valve 63 is opened after the molds have been refilled the flame at the sides of the molds thus being extinguished during the time that such molds are being emptied and refilled.

Manifestly my invention is not limited to the precise construction illustrated in the accompanying drawings hereinbefore described in this specification but numerous changes in the elements shown and described may be resorted to without departing from the spirit of my invention or sacrificing any of its advantages.

What I claim is:

1. In a machine for making ice-cream cones, the combination with a two part conical mold, of a hollow conically shaped core disposed to be moved into and out of said mold, and burners secured to said core, one of said burners being disposed to direct a flame into said core and others of said burners being disposed to direct a flame around the outer surfaces of said mold uniformly to heat said mold and said core.

2. In a machine for making ice-cream cones, the combination with a rotatable wheel, of two part conical molds disposed around the periphery of said wheel, cores disposed to fit said molds and adapted to be moved radially of said wheel into and out of said molds, means for depositing batter within said molds and means adapted to heat said molds and said cores to bake said batter.

3. In a machine for forming and baking ice-cream cones, the combination with a rotatable wheel having a plurality of molds, of a plurality of radially movable hollow cores, a cam for moving said cores into and out of said molds as said wheel rotates, means for depositing batter within said molds, a pipe adapted to emit fuel into said cores, other pipes adapted to emit fuel to be burned around said molds, valves associated with said last named pipes and automatic means adapted to close said valves for a portion only of each revolution of said wheel.

4. In a machine for forming and baking ice-cream cones, the combination with a wheel that is mounted to rotate in a vertical plane, of a plurality of two part molds disposed around the periphery of said wheel, shafts extending crosswise of said wheel, links connecting said mold members with said shafts, automatic means adapted to rotate said shafts at predetermined points in the path of rotation of said wheel to move said mold members together to receive a charge of batter or to move said mold members apart to discharge a baked cone and cores radially movable of said wheel and adapted to fit within said molds to form cones.

5. In a machine for forming and baking ice-cream cones, the combination with a wheel that is adapted to rotate in a vertical plane, of a plurality of a two part molds disposed in the periphery of said wheel, perforated lugs provided on the ends of said molds, transverse core carrying bars movable radially in said wheel, cores provided on said bars and adapted to move into and out of said molds, and dowel pins provided on the ends of said bars and adapted to fit within the perforations in said lugs accurately to canter said cores within said molds.

6. In a machine for forming and baking ice-cream cones, the combination with a frame, of a gas reservoir rotatably associated with said frame, a wheel adapted to rotate with said gas reservoir, molds disposed in the periphery of said wheel, hollow cores movable into and out of said molds to form cones, gas burner pipes secured to said cores one of said pipes being provided with openings adapted to direct gas to be burned into each of said cores and others of said pipes being provided with openings for directing gas to be burned around the sides of said molds, and flexible pipe connectors connecting said gas reservoir with said gas burner pipes.

7. In a machine for forming and baking ice-cream cones, the combination with a rotatable mold carrying wheel, of a plurality of two part mold units secured to said wheel, cores adapted to fit within said mold units, said cores being independently movable radially of said wheel, partitions extending crosswise of said wheel between said two part mold units, means for maintaining the two parts of each of said mold units apart from each other for a predetermined interval in the period of travel of said wheel, gas burner pipes adapted to emit gas to be burned into the space between the sides of said mold members and said partitions, and automatic means for shutting off the supply of such gas during a portion of each revolution of such wheel.

In witness whereof, I hereunto subscribe my name this twelfth day of March, A. D., 1914.

JOHN P. GROSET.

Witnesses:
 FRANK WARREN,
 F. C. MATHENY.